United States Patent
Skoric et al.

(10) Patent No.: US 10,153,883 B2
(45) Date of Patent: *Dec. 11, 2018

(54) METHOD FOR COMMUNICATING IN MOBILE SYSTEM

(71) Applicant: KONINKLIJKE PHILIPS N.V., Eindhoven (NL)

(72) Inventors: Boris Skoric, 's-Hertogenbosch (NL); Ludovicus Marinus Gerardus Maria Tolhuizen, Waalre (NL); Matthew Peter John Baker, Canterbury (GB)

(73) Assignee: Koninklijke Philips N.V., Eindhoven (NL)

( * ) Notice: Subject to any disclaimer, the term of this patent is extended or adjusted under 35 U.S.C. 154(b) by 170 days.

This patent is subject to a terminal disclaimer.

(21) Appl. No.: 15/089,829

(22) Filed: Apr. 4, 2016

(65) Prior Publication Data

US 2016/0218848 A1    Jul. 28, 2016

Related U.S. Application Data

(63) Continuation of application No. 13/766,850, filed on Feb. 14, 2013, now Pat. No. 9,307,524, which is a continuation of application No. 12/933,911, filed as application No. PCT/IB2009/051263 on Mar. 26, 2009, now Pat. No. 8,385,960.

(30) Foreign Application Priority Data

Mar. 26, 2008    (EP) ..................................... 08305070

(51) Int. Cl.
*H04L 5/00*    (2006.01)
*H04W 72/04*    (2009.01)

(52) U.S. Cl.
CPC ......... *H04L 5/0053* (2013.01); *H04W 72/042* (2013.01); *H04W 72/0406* (2013.01); *H04L 5/0007* (2013.01)

(58) Field of Classification Search
None
See application file for complete search history.

(56) References Cited

U.S. PATENT DOCUMENTS

| | | |
|---|---|---|
| 8,385,960 B2 | 2/2013 | Skoric et al. |
| 2003/0086384 A1 | 5/2003 | Kwon et al. |
| 2005/0250497 A1 | 11/2005 | Ghosh et al. |

(Continued)

OTHER PUBLICATIONS

Ericsson, "Summary of Email Discussion on DL Control Signaling", 2GPP Draft, TSG-RAN WG1#52, R1-080869, Feb. 2008, 8 Page Document.

(Continued)

*Primary Examiner* — Kodzovi Acolatse

(57) ABSTRACT

A system, method, and devices for communicating from a primary station to a plurality of secondary station are disclosed. The method includes the step of allocating a resource to the secondary stations over time on the basis of a hash function such that for a particular subframe the control channel elements to be searched in the search space are assigned at an equal probability for different secondary stations, and such that for any pair of subframes, the number of secondary station identifiers which can generate output values i and j is approximately the same for any values of i and j.

16 Claims, 2 Drawing Sheets

(56) References Cited

U.S. PATENT DOCUMENTS

2009/0088148 A1* 4/2009 Chung ................. H04L 5/0007
455/423
2009/0209247 A1* 8/2009 Lee ....................... H04L 5/0007
455/422.1

OTHER PUBLICATIONS

Motorola, "Separch Space Definition for L1/L2 Control Channels", 3GPP TSG RAN1#51, R1-073373, Aug. 2007 Retrieved Fromthe Internet: http//www.3gpp.org/ftp/tsg_ran/WG1_RL1/TSGR1_50/Docs/R1-073373.zip; 11 Page Document, Retrieved Jan. 29, 2009.
Ericsson, "PDCCH Blind Decoding-Outcome of Offline Discussions", R1-081101, Feb. 2008, Retrieved Fromt He Internet: http//ftp.3gpp.org/tsg_ran/WG1_RL1/TSGR1_52/Docs/?C+N;0=d>, 7 Page Document.
Philips, "Analysis of Search Space Design for PDCCH Blind Decoding", 3GPP TSG RAN WG1#52bis, R1-081504, Mar. 26, 2008, 5 Page Document.

* cited by examiner

METHOD FOR COMMUNICATING IN MOBILE SYSTEM

CROSS REFERENCE TO RELATED APPLICATIONS

The present application claims priority under 35 USC § 120 to and is a continuation of U.S. application Ser. No. 13/766,850, filed Feb. 14, 2013, and entitled "Method for Communicating in a Mobile System" which is a continuation of U.S. application Ser. No. 12/933,911, now U.S. Pat. No. 8,385,960, filed Sep. 22, 2010, entitled "Method for Communicating in a Mobile System," which claims the benefit of and is the National Stage of International Application No. PCT/IB2009/051263, filed Mar. 26, 2009, which claims the benefit of and right of priority to under 35 USC § 119 (b) of European Applications No. EP08305070.8 filed Mar. 26, 2008, the contents of each of the aforementioned applications being incorporated by reference herein in their entirety.

FIELD OF THE INVENTION

The present invention relates to a method for communicating between a primary station and a plurality of secondary stations.

This invention is, for example, relevant for telecommunication systems like a mobile telecommunication system. More specifically, this invention is relevant for the UMTS.

BACKGROUND OF THE INVENTION

In a conventional UMTS system, a PDCCH (Physical Downlink Control Channel) message can use 1, 2, 4 or 8 Channel Control Elements (CCEs or resource elements)—referred to as CCE aggregation levels 1, 2, 4 or 8. A search space is a set of aggregated CCEs (with a certain aggregation level) within which a mobile station (or user equipment (UE) or secondary station) performs blind decoding of all PDCCH payloads possible for that aggregation level. Search spaces are defined per aggregation level; a secondary station in such a system thus can have up to four search spaces. For example, the search space of a UE for aggregation level 1 (referred to as 1-CCE) could consist of the CCEs indexed 3, 4, 5, 6, 7, 8, while its search space for aggregation level 8 could consist of the two resource sets of aggregated CCEs consisting of the CCEs indexed by 1, 2, . . . 8 and 9, 10, . . . , 16, respectively. In this example, the UE thus performs six blind decodings for 1-CCEs and two blind decodings for 8-CCEs.

In an example, in order to determine the starting point of the search space, mobile stations (or secondary stations, also termed as UEs, for User Equipments in 3GPP parlance) compute a hash function $f(UE\_ID,s)$, where $UE\_ID$ is the identifier of the UE (different for distinct UEs) and s a time-varying subframe number. It is desirable that different UEs collide (have equal hash value) as infrequently as possible.

The hash function presently proposed within 3GPP is of the form $$f(UE\_ID,s)=K(UE\_ID*16+s)+L \text{ modulo } M,$$

where K, L and M are constants, UE ID is the identifier of the UE, and s is the subframe number. It is clear that with this particular hash function f, two UEs that collide for some subframe number collide persistently, i.e., for all subframe numbers.

SUMMARY OF THE INVENTION

It is an object of the invention to propose a method for communicating which permits the probability of collisions to be reduced.

Another object of the invention is to provide a method for communicating preventing two UEs from repeatedly colliding.

To this end, according to a first aspect of the invention, a method is proposed for communicating from a primary station to a plurality of secondary stations, comprising the step of at the primary station allocating a resource to the secondary stations over time on the basis of a hash function, wherein the hash function is such that the probability that two secondary stations are allocated common resources in two subframes substantially equals the product of the probability that the two secondary stations are allocated a common resource in the first subframe and the probability that the two secondary stations are allocated a common resource in the second subframe.

As a consequence, the hash functions proposed here aim to reduce the likelihood of persistent collisions. In fact, the hash functions are such that the probability that different UEs collide in two subframes is approximately equal to the probability that two UEs collide in the first of these subframes times the probability that two UEs collide in the second of these subframes. Thus, it is unlikely that two UEs collide repeatedly.

In a specific embodiment of the method, the hash function has the form: $f(x, s)=(h(x) \bmod g(s)) \bmod M$, where x is a parameter of each secondary station, s is the subframe number, h is a function dependent on x, g is a function dependent on s, M is a constant, and mod is the modulo function. In another specific embodiment of the method, h is a constant multiplier.

The present invention also relates to a secondary station comprising means for communicating with a primary, the secondary station further comprising control means configured to search at least one of a plurality of search spaces, each search space comprising at least one resource set, where at least one resource set might be used to transmit a message to the considered secondary station, wherein the search space of the secondary station is determined on the basis of a hash function, wherein the hash function is such that the probability that two secondary stations are configured to have common resources in the search spaces in both of any two subframes substantially equals the product of the probability that the two secondary stations are configured to have a common resource in the first subframe and the probability that the two secondary stations are configured to have a common resource in the second subframe;

wherein the control means are configured for searching in the configured at least one search space for a control message from the primary station addressed to the considered secondary station, and receiving the control message.

In accordance with still another aspect of the invention, it is proposed a primary station comprising means for communicating with a plurality of secondary stations, the primary station further comprising allocating means to allocate at least one resource set to a given secondary station into at least one of a plurality of search spaces, each search space comprising at least one resource set, wherein the search space of the given secondary station is determined on the basis of a hash function, wherein the hash function is such that the probability that two secondary stations are configured to have common resources in the search spaces in both of any two subframes substantially equals the product of the probability that the two secondary stations are configured to have a common resource in the first subframe and the probability that the two secondary stations are configured to have a common resource in the second subframe.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for communicating in a network, like a cellular network. For instance, the network may be a UMTS network as depicted on FIG. 1.

Figure 1:
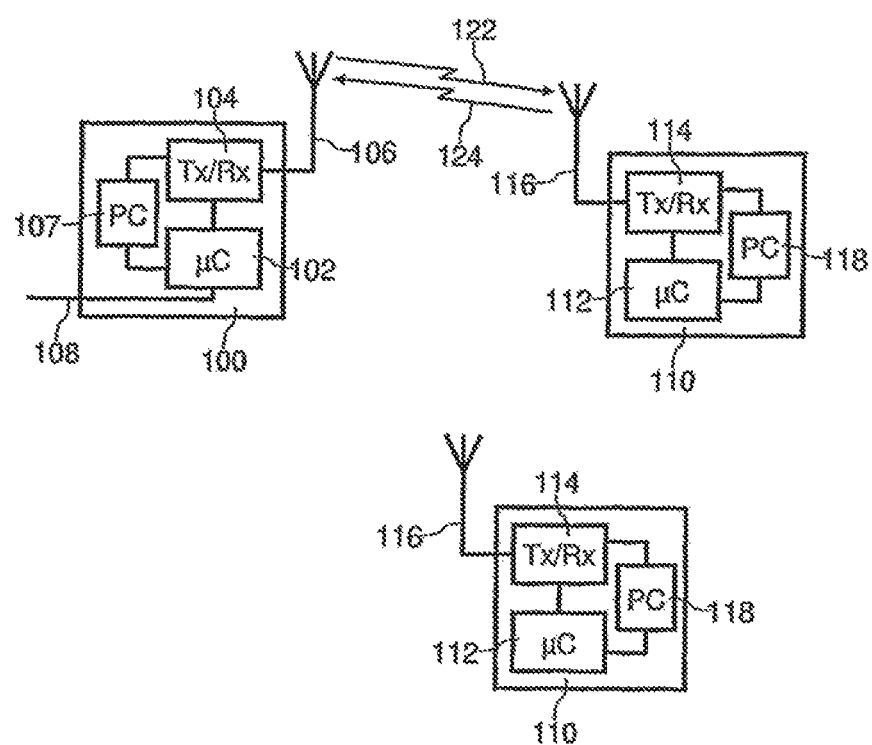
FIG. 1 is a block diagram of a system in accordance with the invention comprising a primary station and at least a secondary station.

Referring to FIG. 1, a radio communication system in accordance with the invention comprises a primary station (BS) 100 and a plurality of secondary stations (MS) 110. The primary station 100 comprises a microcontroller (µC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from primary station 100 to mobile station 110 takes place on a downlink channel, while communication from secondary station 110 to primary station 100 takes place on an uplink channel.

One of the downlink control channels received by the secondary stations is the PDDCH, where each secondary station has to blindly decode a plurality of sets of CCEs to find which set was allocated to it as set out in the preamble of the description.

In accordance with a first embodiment of the invention, results of various simulations carried out by the inventors are described. With these simulations, it is assumed that 48 CCEs are available. This corresponds to the illustrative exemplary first embodiment of the invention. Various sets of 48 search spaces for the 1-CCEs have been considered; to each user to which a 1-CCE is to be sent, one of these 48 search spaces is assigned at random (the choice corresponds to the outcome of a hash function of that UE that we model as being uniform over the numbers 1, 2, . . . , 48). Each search space consists of six CCEs in this example.

The following sets of search spaces have been considered:

S_1: all search spaces contiguous—i.e. of the form {i,i+1, i+2,i+3,i+4,i+5} with 0≤i≤47 where i is the CCE index, and all elements modulo 48.

S_5: all search spaces of the form {i,i+5,i+10,i+15,i+20,i+25} with 0≤i≤47, and all elements modulo 48.

S_7: all search spaces of the form {i,i+7,i+14,i+21,i+28,i+35} with 0≤i≤47, and all elements modulo 48.

S_d: all search spaces of the form {i,i+1,i+3,i+7,i+12,i+22} with 0≤i≤47, and all elements modulo 48. S_d is designed so that all search spaces overlap in just 1 CCE.

So, for example, the search space of S_5 corresponding to i=25 consists of the CCEs indexed by 25, 30, 35, 40, 45, 2 (as 50 modulo 48 equals 2).

Figure 2:
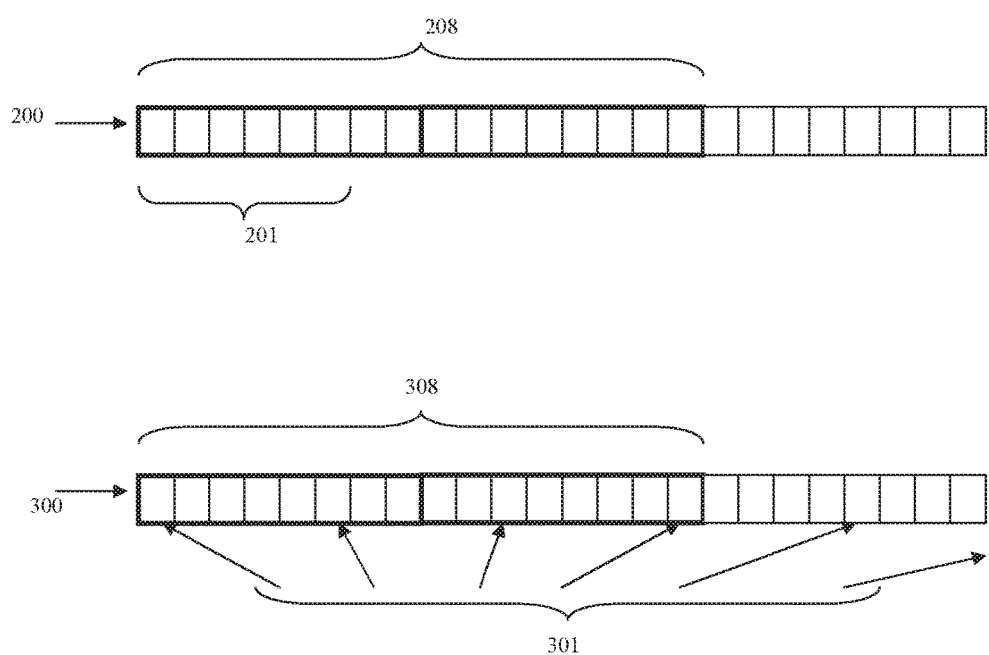
FIG. 2 is a time chart representing the allocated search spaces in accordance an embodiment of the invention.

FIG. 2 illustrates the use of a pattern enabling the number of resource elements in common to be minimized, in accordance with the first embodiment, compared with the prior art. On FIG. 2, a set of available resources 200 are depicted.

In a conventional system, if only sets of 1-CCEs and 8-CCEs are considered, the search space for one secondary station or UE for 8-CCE messages (2 positions 208 are constructed from contiguous groups of CCEs) is depicted on FIG. 2. The positions 201 of 1-CCE messages (6 contiguous positions) are such that it is likely that all possible positions are blocked if another UE is receiving an 8-CCE message.

In accordance with the first embodiment of the invention, the set of available resources 300 comprises search space for one UE for 8-CCE messages 308, as on FIG. 2 where 2 positions are constructed from contiguous groups of CCEs. Regarding the search space for a UE for 1-CCE messages, 6 non-contiguous positions 301 are represented. These positions are non contiguous, so that they reduce overlap with higher aggregation-level search space and therefore increase likelihood that a position can be found to send a small message.

In order to determine the start of the search space of each secondary station, each secondary station uses a hash function. The hash functions disclosed in accordance with this embodiment aim to reduce the likelihood of persistent collisions. In fact, the hash functions are such that the probability that different UEs collide in two subframes is approximately equal to the probability that two UEs collide in the first of this subframes times the probability that two UEs collide in the second of these subframes. Stated differently, collision events in different subframes are approximately independent.

In fact, we describe functions $f_s(x)$ with $x \in X$, $s \in \{0,1, \ldots, T-1\}$ into $\{0,1, \ldots, M-1\}$. The variable x corresponds to the UE_ID in the present situation, and s to the subframe number. The functions have the following properties.

1. For each $s \in \{0,1, \ldots, T-1\}$, the function $f_s$ attains each element in $\{0,1, \ldots, M-1\}$ approximately equally often.

2. For all distinct s,t in $\{0,1, \ldots, T-1\}$, the number of elements x in X such that $f_s(x)=i$ and $f_t(x)=j$ is approximately the same for all values of i and j.

We propose to use sets of hash functions of the form $$f_s(x)=(Ax \bmod M_s) \bmod M$$

where A is a constant number and $M_0, M_1, \ldots, M_{T-1}$ are different numbers. It is advantageous if $M_0, M_1, \ldots, M_{T-1}$ are relatively prime to each other and to M.

As a variant of the first embodiment, the following parameters are selected:

T=10, UE ID in X={0,1, . . . , $2^{24}$−1}, M=47, and A=1. For the multipliers $M_0, M_1, \ldots, M_9$, we take ten prime numbers close to $2^{12}$, as depicted in the following table.

To test the "uniformity" of each of the T=10 hash functions, i.e., Property 1 above, we counted for i=0, . . . , M−1, the number of elements $x \in X$ for which $f_s(x)=i$. The quotient of the smallest of these numbers and the largest of these numbers are computed. In case of a uniform distribution, this quotient would equal one; we thus wish that the quotient should be approximately one. For our specific choice of $M_0, M_1, \ldots, M_9$, the computed quotients range from 09885 to 09906.

TABLE 1

List of multipliers

| s | $M_s$ |
|---|---|
| 0 | 4057 |
| 1 | 4073 |
| 2 | 4079 |
| 3 | 4091 |
| 4 | 4093 |
| 5 | 4099 |
| 6 | 5003 |
| 7 | 5009 |
| 8 | 5011 |
| 9 | 5021 |

To test the independence of the hash functions $f_s$ and $f_t$, i.e. Property 2 above, we computed for all pairs (i,j) the number elements $x \in X$ for which $f_s(x)=i$ and $f_t(x)=j$.

Next, we computed the quotient of the smallest of these $M^2$ number and the largest of these $M^2$ numbers. Ideally, we would like this quotient to be equal to one. For our specific choice of $M_0, M_1, \ldots, M_9$, the computed quotients range from 0.9752 to 0.9808.

We can conclude that in the embodiment, the hash functions are approximately uniform and approximately independent.

In the envisioned application, the values of T and the range X is fixed while M may vary. For implementation reasons, it is advantageous that $M_0, M_1, \ldots, M_{T-1}$ do not depend on M. If we change M to 24, the computed quotients for uniformity range from 0.9941 to 0.9952; the computed quotients for testing independence range from 0.9779 to 0.9889. So also for this case, the proposed hash functions are approximately uniform and approximately independent. If we change M to 120, the computed quotients for uniformity range from 0.9706 to 0.9762; those for testing independence range from 0.9330 to 0.9474.

The invention may be applicable to mobile telecommunication systems like UMTS LTE and UMTS LTE-Advanced, but also in some variants to any communication system having allocation of resources to be done dynamically or at least semi persistently.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A method for operating a secondary station for communicating in a network with a primary station, the method comprising:
   determining, at least one search space of a plurality of search spaces of the secondary station based on a hash function fs(x), wherein x corresponds to an identifier of a secondary station and s corresponds to a subframe number, and wherein each search space includes at least one set of resource elements,
   controlling an antenna and transceiver to communicate in the network to receive messages, and
   searching, in a message of the received messages in the at least one determined search space for a control message from the primary station that is addressed to the secondary station and performing a blind decoding of the at least one set of resource elements,
   wherein for a particular subframe s, the function fs outputs a resource element to be searched, wherein the output of the resource element to be searched occurs approximately equally often as any other output resource element from the function fs, and
   wherein for each pair of different subframes, the number of secondary station identifiers which can generate output values i and j is approximately the same for any values of i and j, where i and j correspond to resource elements to be searched.

2. The method of claim 1, wherein for two distinct subframes s, t, the outputs of the hash functions fs(x), ft(x) are substantially independent from each other.

3. The method of claim 1, wherein the identifier of the secondary station is different for each different respective secondary station of the network.

4. The method of claim 1, wherein the probability that two secondary stations are configured to have common resources in the search spaces for any two subframes substantially equals the product of the probability that the two secondary stations are configured to have a common resource in the first subframe and the probability that the two secondary stations are configured to have a common resource in the second subframe.

5. A primary station configured to communicate in a network, the primary station comprising:
   a transceiver and antenna configured to enable the primary station to communicate in the network with a secondary station; and
   a control circuit configured to:
   determine at least one search space of a plurality of search spaces of the secondary station based on a hash function fs(x), wherein x corresponds to an identifier of a secondary station and s corresponds to a subframe number, and wherein each search space includes at least one set of resource elements,
   allocate at least one respective resource set to the secondary station into the at least one determined search space of the plurality of search spaces of the secondary station, each search space comprising at least one set of resource elements, and
   control the transceiver and antenna to transmit, on a downlink channel, a control message addressed to the secondary station from the primary station, using at least a portion of the set of resource elements allocated to the secondary station, wherein for a particular subframe s, the function fs outputs a resource element to be searched, wherein the output of the resource element to be searched occurs approximately equally often as any other output resource element from the function fs, wherein a blind decoding of the at least one set of resource elements is performed,
   and wherein for each pair of different subframes, the number of secondary station identifiers which can generate output values i and j is approximately the same for any values of i and j, where i and j correspond to resource elements to be searched.

6. The primary station of claim 5, wherein for two distinct subframes s, t, the outputs of the hash functions fs(x), ft(x) are substantially independent from each other.

7. The primary station of claim 5, wherein the identifier of the secondary station is different for each different respective secondary station of the network.

8. The primary station of claim 5, wherein the probability that two secondary stations are configured to have common resources in the search spaces for any two subframes substantially equals the product of the probability that the two secondary stations are configured to have a common resource in the first subframe and the probability that the two secondary stations are configured to have a common resource in the second subframe.

9. A secondary station configured to communicate in a network, the secondary station comprising:
an antenna and transceiver configured to enable the secondary station to communicate in the network; and
a control circuit configured to:
determine at least one search space of a plurality of search spaces of the secondary station based on a hash function fs(x), wherein x corresponds to an identifier of a secondary station and s corresponds to a subframe number, and wherein each search space includes at least one set of resource elements;
control the antenna and transceiver to receive messages from the network, and
search in a message of the received messages in the at least one determined search space to find a control message from a primary station, addressed to the secondary station, wherein for a particular subframe s, the function fs outputs a resource element to be searched, wherein the output of the resource element to be searched occurs approximately equally often as any other output resource element from the function fs, wherein a blind decoding of the at least one set of resource elements is performed;
and wherein for each pair of different subframes, the number of secondary station identifiers which can generate output values i and j is approximately the same for any values of i and j, where i and j correspond to resource elements to be searched.

10. The secondary station of claim 9, wherein for two distinct subframes s, t, the outputs of the hash functions fs(x), ft(x) are substantially independent from each other.

11. The secondary station of claim 9, wherein the identifier of the secondary station is different for each different respective secondary station of the network.

12. The secondary station of claim 9, wherein the probability that two secondary stations are configured to have common resources in the search spaces for any two subframes substantially equals the product of the probability that the two secondary stations are configured to have a common resource in the first subframe and the probability that the two secondary stations are configured to have a common resource in the second subframe.

13. A method of operating a primary station for communicating in a network, the method comprising:
allocating, via a control circuit, at least one resource set to at least one of a plurality of search spaces of the secondary station on a hash function fs(x), wherein x corresponds to an identifier of a secondary station and s corresponds to a subframe number, and wherein each search space includes at least one set of resource elements; and
controlling, via the control circuit, a transceiver and antenna to transmit a control message to the secondary station, addressed to the secondary station, using at least a portion of the allocated set of resource elements, wherein a blind decoding of the at least one set of resource elements is performed,
wherein for a particular subframe s, the function fs outputs a resource element to be searched, wherein the output of the resource element to be searched occurs approximately equally often as any other output resource element from the function fs;
and wherein for each pair of different subframes, the number of secondary station identifiers which can generate output values i and j is approximately the same for any values of i and j, where i and j correspond to resource elements to be searched.

14. The method of claim 13, wherein for two distinct subframes s, t, the outputs of the hash functions fs(x), ft(x) are substantially independent from each other.

15. The method of claim 13, wherein the identifier of the secondary station is different for each different respective secondary station of the network.

16. The method of claim 13, wherein the probability that two secondary stations are configured to have common resources in the search spaces for any two subframes substantially equals the product of the probability that the two secondary stations are configured to have a common resource in the first subframe and the probability that the two secondary stations are configured to have a common resource in the second subframe.

* * * * *